United States Patent [19]
Tsai

[11] Patent Number: 6,126,138
[45] Date of Patent: Oct. 3, 2000

[54] PRESSURE REDUCING VALVE AND CONTINUOUSLY VARIABLE TRANSMISSION WITH CONTROL ARRANGEMENT USING SAME

[75] Inventor: Shan-Chin Tsai, Rockford, Ill.

[73] Assignee: Hamilton Sundstrand Corporation, Rockford, Ill.

[21] Appl. No.: 09/222,955

[22] Filed: Dec. 30, 1998

[51] Int. Cl.[7] ............................ F16H 59/00; B60K 41/12; F16K 31/12
[52] U.S. Cl. ................................. 251/33; 474/18; 474/28; 477/45
[58] Field of Search ................................. 474/18, 17, 28, 474/69, 70; 477/38, 39, 45, 48; 137/596.1, 540, 529, 528, 110, 625.69, 625.3; 91/376 K, 443; 251/282, 329, 33, 30.01

[56] References Cited

U.S. PATENT DOCUMENTS

| | | |
|---|---|---|
| 2,625,136 | 1/1953 | Moog . |
| 2,729,242 | 1/1956 | Olson ................................. 251/33 X |
| 3,690,400 | 9/1972 | Uchiyama . |
| 4,321,941 | 3/1982 | Hunschede et al. . |
| 4,500,301 | 2/1985 | Cadee . |
| 4,590,968 | 5/1986 | Wölfges . |
| 4,665,775 | 5/1987 | Nagamatsu et al. ................... 474/28 X |
| 4,669,336 | 6/1987 | Okada et al. .......................... 474/28 X |
| 4,702,725 | 10/1987 | Kouno et al. .............................. 474/28 |
| 4,785,849 | 11/1988 | Masuda . |
| 4,898,361 | 2/1990 | Bender et al. . |
| 4,995,283 | 2/1991 | Sawasaki et al. .......................... 477/39 |
| 5,042,832 | 8/1991 | Takahashi et al. . |
| 5,054,599 | 10/1991 | Marcott . |
| 5,169,366 | 12/1992 | Reniers .................................. 474/18 X |
| 5,263,387 | 11/1993 | Reniers .................................. 474/18 X |
| 5,273,297 | 12/1993 | Gerdes . |
| 5,417,402 | 5/1995 | Speybroeck ........................... 251/33 X |
| 5,720,691 | 2/1998 | Ogawa et al. ............................. 477/45 |
| 5,722,459 | 3/1998 | Kim . |
| 5,769,386 | 6/1998 | Sugiura et al. ........................ 251/33 X |

*Primary Examiner*—David A. Bucci
*Assistant Examiner*—Marcus Charles
*Attorney, Agent, or Firm*—Antonelli, Terry, Stout & Kraus

[57] ABSTRACT

A pressure reducing valve and a continuously variable transmission comprising an output pressure feedback loop operatively connected to provide proportional control of an output pressure of a flow of fluid passing through the pressure reducing valve in response to an input signal applied to a pilot stage control valve of the pressure reducing valve from an external source. The pressure reducing valve includes a main stage two-way spool valve having a valve body and a valve spool movable within the valve body in response to an imbalance of forces on the valve spool. The valve body has a supply port for receiving pressurized fluid from a source of constant hydraulic pressure and a load port for communicating a load pressure and flow from the spool valve to an actuator of the secondary pulley of the transmission to maintain transmission belt tension while preventing or minimizing belt slippage. The open area of the load port is dependent on the position of the valve spool within the valve body.

3 Claims, 6 Drawing Sheets

PRESSURE REDUCING VALVE AND CONTINUOUSLY VARIABLE TRANSMISSION WITH CONTROL ARRANGEMENT USING SAME

FIELD OF THE INVENTION

A pressure reducing valve and a continuously variable transmission with a control arrangement including the valve are used as a constant speed drive for an aircraft electrical power generator.

BACKGROUND AND SUMMARY OF THE INVENTION

A pressure reducing valve with manually adjustable setting using a screw and spring, is known. However, with this known pressure reducing valve, once the control pressure is set, it remains constant during operation. In some applications, the control pressure needs to be varied according to the requirement of the application. See the co-pending, commonly assigned U.S. patent application Ser. No. 09/222,948, for CONTINUOUSLY VARIALBE TRANSMISSION WITH CONTROL ARRANGEMENT AND METHOD FOR REDUCING TRANSMISSION BELT SLIPPAGE filed concurrently with this application and hereby incorporated by reference, for a detailed disclosure of such an application.

The variable pulley transmission, or continuously variable transmission (CVT) as it is commonly called, has been under development for two decades, its use as a power transmission is mainly for automotive applications. Its control is rather complicated and is very sensitive to operating conditions. For example, in a control arrangement for a variable transmission disclosed in U.S. Pat. No. 4,458,318, a variable line pressure is controlled and applied to the sheave of the secondary or driven pulley of the transmission, and also serves as the hydraulic power supply to a ratio control valve in a speed control loop of the transmission. Due to the variable supply pressure in this known continuously variable transmission, both the pressure control valve (a pressure relief type valve) and the ratio control valve gains change with the supply pressure, and the control is therefore very sensitive to system operating conditions.

There is a need for an improved continuously variable transmission with a control arrangement including a pressure reducing valve for reduction of belt slippage in the transmission which overcomes these drawbacks and disadvantages of known pressure control valves and continuously variable transmissions. More particularly, there is a need for an improved pressure reducing valve and continuously variable transmission with control arrangement using the same which are simpler and more robust than those disclosed in U.S. patent Ser. No. 4,458,318.

It is an object of the present invention to provide a pressure reducing valve and a continuously variable transmission with control arrangement using the valve which meet this need.

Another object of the present invention is to provide a pressure reducing valve and a continuously variable transmission with control arrangement using the valve for use as a constant speed drive for an aircraft electrical power generator where belt slippage can be minimized or eliminated.

These and other objects are attained by the pressure reducing valve of the invention which, is a two-stage pressure reducing valve comprising a pilot stage control valve providing an output control pressure and flow of a fluid to a main stage valve from a hydraulic pressure source passing through the pilot stage control valve in response to an input signal applied to the pilot stage control valve from an external source. The control valve includes a fixed orifice through which the flow of fluid from the source passes, and a variable orifice downstream of the fixed orifice in a flow passage through the pilot stage control valve. The opening of the variable orifice is controlled by the input signal applied to the pilot stage control valve from the external source for varying the output control pressure provided by the pilot stage control valve.

The pressure reducing valve of one embodiment further comprises, as the main stage valve, a two-way spool valve having a valve body and a valve spool movable within the valve body in response to an imbalance of forces on the valve spool. The valve body has a supply port for receiving pressurized fluid from the source of hydraulic pressure and a load port for communicating a load pressure and flow of pressurized fluid from the spool valve to a hydraulic load. The open area of the load port is dependent on the position of the valve spool within the valve body. The valve body has a first passage communicating the control pressure and flow from the pilot stage control valve to one end of the spool valve and a second passage communicating a feedback pressure and flow from the load pressure from the spool valve to the other end of the valve spool. The position of the valve spool within the valve body depends on the pressure difference applied on the two ends of the valve spool whereby the load pressure from the spool valve to the hydraulic load can be made proportional to the input signal applied to the pilot stage control valve.

The pressure reducing valve can be operated in either an open-loop or a closed-loop configuration to provide simple, effective control of the output control pressure and flow to the hydraulic load in response to the input signals applied to the pilot stage control valve.

In another form of the invention, the main stage spool valve is a three-way spool valve with the valve body comprising a drain port for discharging pressurized fluid from the spool valve to lower the load pressure from the spool valve. In this embodiment, the open area of the supply port and the open area of the drain port are controlled by the position of the valve spool within the valve body.

The pilot stage control valve in a first embodiment of the invention is a linear solenoid valve which is controlled by a voltage applied to a solenoid thereof as the input signal for varying control pressure. In another form of the invention, the pilot stage control valve is a torque motor controlled single-jet flapper valve having a torque motor and a flapper valve whose position is controlled by the motor for varying the distance the flapper valve is away from the variable orifice thereby controlling the opening thereof in response to a voltage applied to the torque motor as the input signal applied to the pilot control control valve.

A continuously variable transmission according to the invention for transferring drive from an engine to a device to be driven, comprises a primary pulley for receiving drive from an engine, a belt, a secondary pulley which is coupled over the belt of the primary pulley for transferring drive to a device to be driven. The primary and secondary pulleys each have a fixed sheave and an axially movable sheave with a hydraulically operated actuator therfor to effect ratio change of the transmission and to maintain belt tension. A single source of constant hydraulic pressure is operatively connected for driving each of the actuators. The single source of constant hydraulical pressure is connected to the actuator of the primary pulley by way of a ratio control valve and is operatively connected to the actuator of the secondary pulley by way of a pressure reducing valve according to the invention. In the preferred embodiment, the transmission drives an electric generator of an aircraft where the pressure reducing valve is part of a hydraulic pressure control loop for controlling the hydraulic pressure applied to the actuator of the secondary pulley by way of the pressure reducing valve as a function of the load from the generator on the transmission and the pulley pitch radius of the secondary pulley.

These and other objects, features and advantages of the present invention will become more apparent from the following detailed description of several embodiments of the invention taken with the accompanying drawings.

DETAILED DESCRIPTION OF THE DISCLOSED EMBODIMENTS

Figure 1:
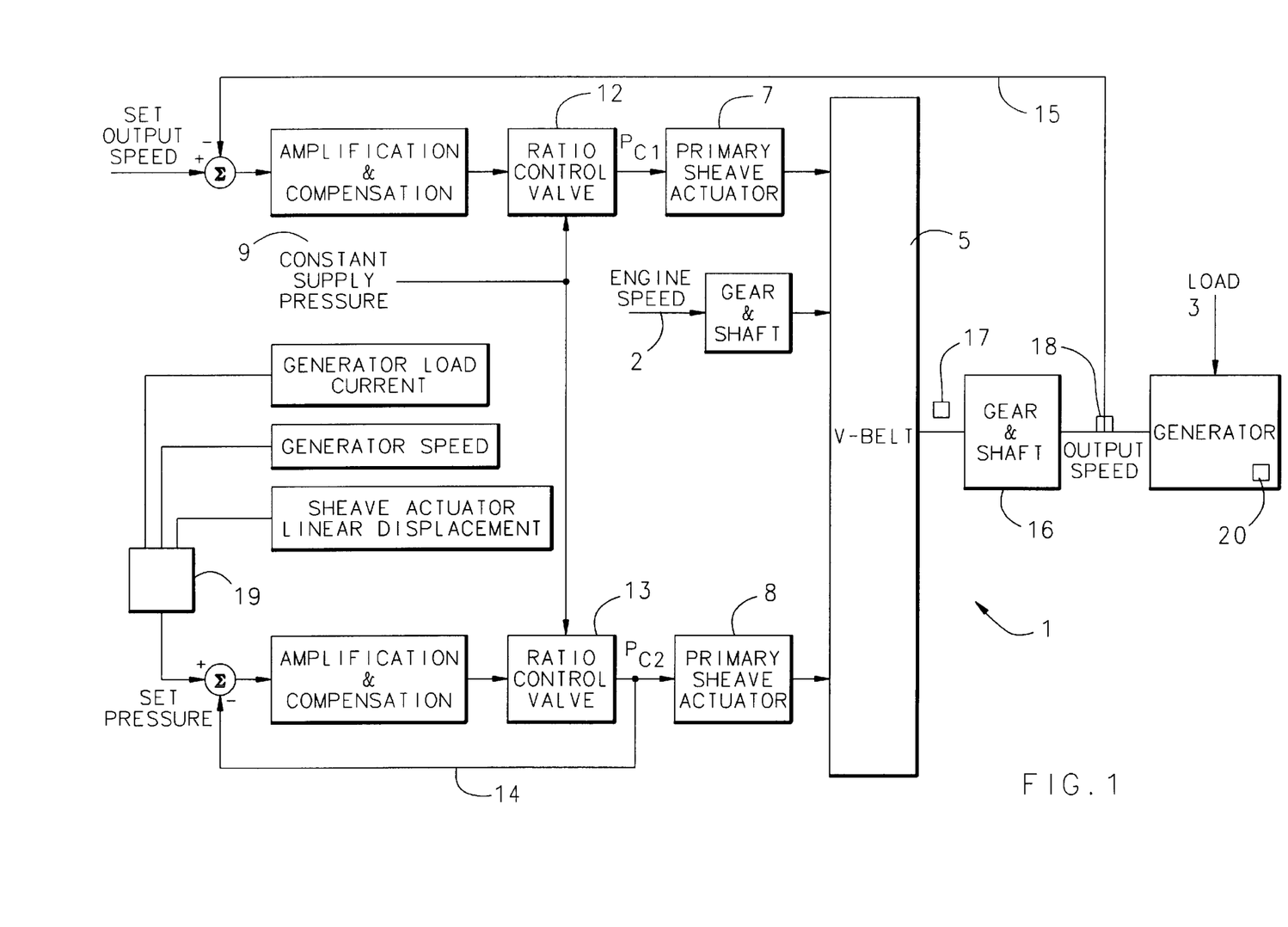
FIG. 1 is a schematic illustration of a continuously variable pulley transmission of the invention including the control arrangement thereof used as a constant speed drive for an aircraft electric generator.

Referring now to the drawings, FIG. 1 depicts a continuously variable transmission 1 of the invention for transferring drive from an engine 2 to a device 3 to be driven. The transmission 1 comprises a primary pulley 4, shown schematically in FIG. 2, receiving drive from the engine, a belt 5 and a secondary pulley 6 which is coupled over the belt to the primary pulley 4 for transferring drive to the device 3. The primary and secondary pulleys each have a fixed sheave, 22 and 22' respectively, and an axially movable sheave, 23 and 23' respectively. The positions of the axially movable sheaves are adjustable by respective hydraulically operated actuators 7 and 8 to effect ratio change in the transmission and to maintain belt tension. A single source 9 of constant hydraulic pressure is operatively connected for driving each of the actuators 7 and 8.

Figure 2:
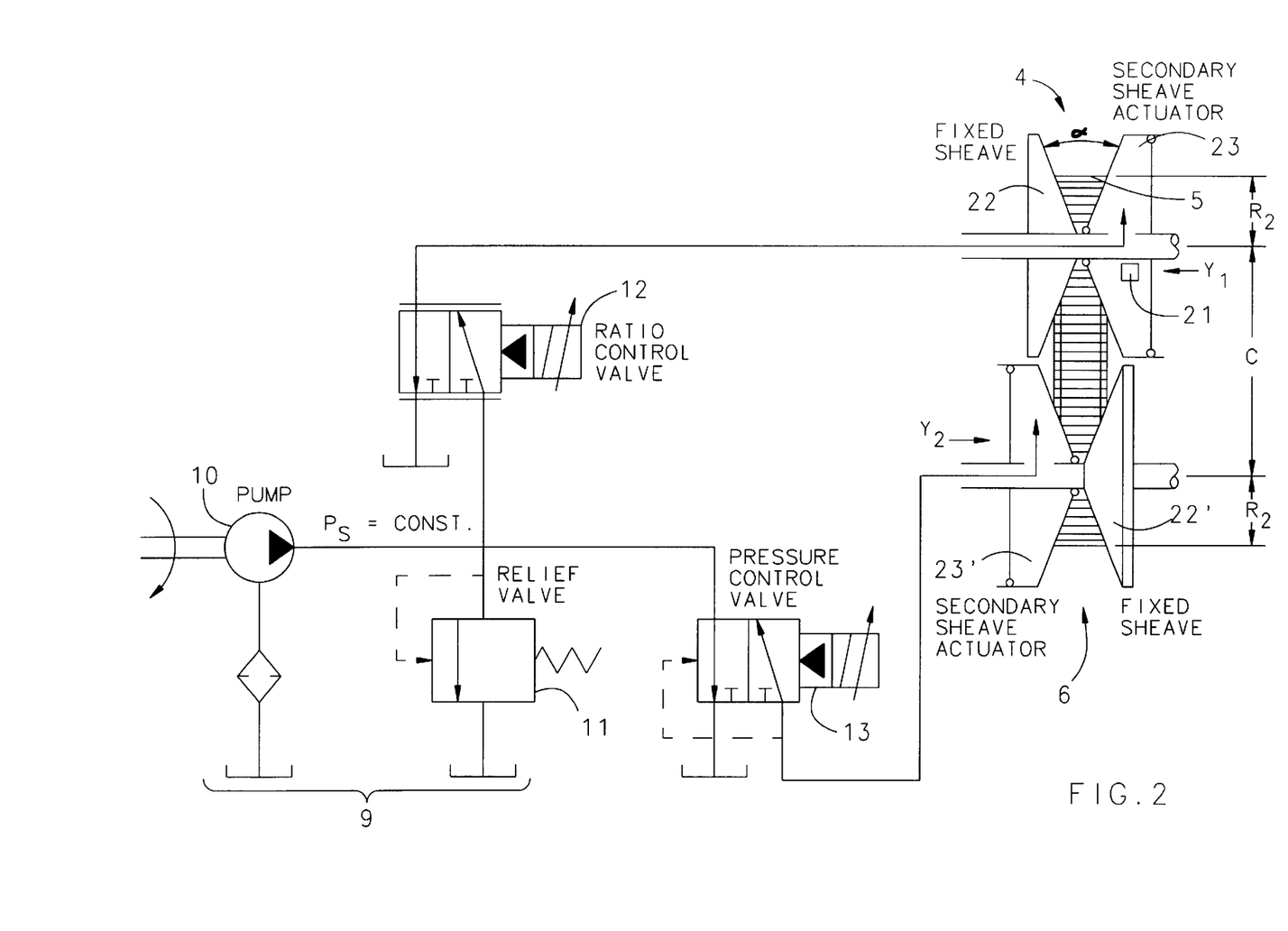
FIG. 2 is a schematic drawing of the continuously variable transmission hydraulic system of the embodiment of FIG. 1.

In the disclosed embodiment, as illustrated in FIG. 2, the source of constant hydraulic pressure 9 comprises a hydraulic pump 10 and a pressure relief valve 11 in communication with the output of the hydraulic pump to maintain a constant supply pressure Ps of the pump as denoted in FIGS. 1 and 2. The single source of constant hydraulic pressure is operatively connected to the primary sheave actuator 7 by way of a ratio control valve 12. The ratio control valve may be a two-stage three-way servo-valve of the type disclosed in U.S. Pat. No. 4,458,318, for example. The constant supply pressure 9 is operatively connected to the secondary sheave actuator 8 by way of a pressure control valve 13. The valve 13 is a pressure reducing type valve according to the invention, particularly an electrohydraulic pressure reducing valve as shown in FIGS. 3–6 and described in more detail below.

For a continuously variable transmission to work properly, it has to be controlled such that, firstly, enough force is applied to the secondary sheave, the driven sheave, to keep the belt from slipping, and secondly, a variable force must be applied to the primary sheave, the driver sheave, to change the transmission ratio according to the requirement of system operation. In the disclosed embodiment, the requirement of system operation is for constant speed drive application for driving device 3, which is an aircraft electrical generator, whereby the transmission output speed must be maintained constant. The electronic-hydraulic control system of the continuously variable transmission 1 in the disclosed embodiment is used to control the above-mentioned two functions.

The control system comprises two main control loops: a pressure control loop 14 to control the force applied to the secondary sheave by actuator 8 for controlling belt tension, and an output speed control loop 15 for controlling the transmission ratio to maintain the transmission output speed, namely the output shaft speed of the secondary pulley 6, at a constant value under varying engine speed and generator load conditions. This control arrangement of the transmission 1 is simpler and more robust than the previous arrangement in U.S. Pat. No. 4,458,318. Without the constant supply pressure source 9 of the invention, a complicated gain scheduling scheme will be required to compensate for changes in supply pressure that cause belt slippage in the conventional continuously variable transmission.

The force required to be applied to the axially movable sheave of the secondary pulley by actuator 8 to keep the belt 3 from slipping is a function of load torque and the pulley pitch radius. A method for reducing belt slippage in the continuously variable transmission comprises determining the hydraulic pressure to be applied to the actuator 8 of the secondary pulley to keep the belt from slipping. This determining step includes determining the load torque $TQ_o$ transmitted from the device to be driven to the secondary pulley of the transmission and the pitch radius $r_2$ of the secondary pulley, and calculating a value for the set pressure Pset of the hydraulic pressure control loop to be applied to the actuator 8 of the secondary pulley 6 in accordance with the relationship $$Pset = \left(\frac{TQ_o}{r_2} \cdot \frac{\cos(\alpha/2)}{2\mu}\right) \bigg/ As$$

where:

$TQ_o$ is the torque on the secondary pulley from the device to be driven $r_2$ is the secondary pulley pitch radius, $\alpha$ is the pulley groove angle, $\mu$ the coefficient of friction between the belt and the secondary pulley, and As is the area of the actuator for the sheave of the secondary pulley.

The step of determining the load torque transmitted from the generator 3 to the secondary pulley of the continuously variable pulley transmission 1 according to the invention includes measuring the generator load current $I_L$ with current detector 20, the generator speed $N_G$ with speed sensor 18 and the linear displacement $Y_1$ of the primary sheave actuator 7 using detector 21. From the geometry of the primary pulley 4, its pitch radius of $r_1$ is calculated from the measured sheave actuator displacement $Y_1$. The generator torque $TQ_G$ is calculated given the measurements of $I_L$, $N_G$, and $Y_1$ as set forth below. From the constraint of constant belt length of belt 5 and constant distance C between the centers of the two pulleys 4 and 6, the pitch radius $r_2$ of the driven pulley 6 is then calculated using the now known pitch radius $r_1$. Alternatively, the pitch radius $r_2$ could be directly measured using a proximity sensor, for example.

The torque $TQ_o$ at the output shaft of the secondary pulley 6 of the transmission 1 is then calculated as set forth below using the previously calculated generator torque $TQ_G$ and the generator side gear ratio $R_{Go}$ of the gear and shaft unit 16 drivingly connected between the output shaft of the transmission and the generator 3 as depicted in FIG. 1. Using these values, the hydraulic pressure required, $P_{set}$, which serves as the command signal from calculating unit or microprocessor 19 to the pressure control loop 14, is obtained from the calculated force divided by the secondary sheave actuator area $A_s$. The procedure for calculating the set pressure $P_{set}$ for control loop 14 is set forth in the flow diagram of FIG. 3 in the aforementioned, co-pending, commonly assigned application Serial No.

For sensing the load of the generator on the transmission, in addition to or instead of measuring the generator load current $I_L$, a torque sensor 17 mounted on the output shaft of the secondary pulley of the transmission can also be used. This provides an even more direct measurement of the load. Further, instead of measuring the linear displacement of the primary sheave, the displacement of the actuator of the secondary sheave can be measured for determining the pitch radius $r_2$, but there is no need to measure the displacement of both sheaves. To provide some safety margin, the calculated pressure $P_{set}$ is preferably multiplied by a factor of, for example, 1.2 to guard against belt slippage while avoiding undue force on the belt which would shorten the life of the belt and the pulleys. Calculation of the set pressure $P_{set}$ is accomplished by the suitably programmed microprocessor of controller 19, given the measurements of $I_L$, $N_G$ and $Y_1$ and proceeds as follows:

$$\text{Power} = 3 \times 115 \times I_L$$

$$TQ_G = \frac{8.8507 \text{ Power}}{N_G(\pi/30)}$$

$$TQ_O = TQ_G / R_{GO}$$

$$r_1 = \frac{Y_1}{2\tan(\alpha/2)}$$

$$r_2 = \frac{-(\pi c - 2r_1) + \sqrt{(\pi c - 2r_1)^2 + 4(LC - 2c^2 - \pi r_1 c - r_1^2)}}{2}$$

$$P_{set} = \left(\frac{TQ_o}{r_2} \cdot \frac{\cos(\alpha/2)}{2\mu}\right) / A_s$$

where:

$A_s$—secondary sheave actuator area, in$^2$
α—pulley groove angle, deg
C—pulley center distance, in
L—belt length, in
NG—generator speed, rpm
$r_1$—primary pulley pitch radius, in
$r_2$—secondary pulley pitch radius, in
$R_{GO}$—generator side gear ratio $P_{set}$—set pressure of the pressure control loop
$TQ_g$—generator torque, in-lbs
$TQ_o$—torque at secondary sheave shaft, in-lbs
$Y_1$—primary sheave actuator linear displacement, in
μ—coefficient of friction In the speed control loop 15, the set speed command signal is a constant, depending on the number of poles of the generator used, for example, and is selected to give a 400 cps revolution at the generator shaft in the case of a two pole generator, or a 200 cps revolution in the case of a four pole machine. The generator speed is measured by a sensor 18, FIG. 1, and compared with the set output speed command. The sensor 18 also provides a generator speed signal to calculating unit 19. The imbalance of forces applied on the primary and secondary sheaves causes the continuously variable transmission ratio to change. Given a force applied on the secondary sheave, the speed control loop 15 will automatically adjust the force applied on the primary sheave to change the transmission ratio by way of ratio control valve 12 to match the generator speed to the speed command.

The pressure reducing valve 13 according to the invention includes an output pressure feedback loop operably connected to provide proportional control of an output pressure of a flow of fluid passing through the valve 13 in response to an input signal applied to the valve from an external source. In the embodiment of the invention illustrated in FIG. 3, the pressure reducing valve 13 includes a pilot stage control valve in the form of a linear solenoid valve 41 and a two-way spool valve 42 operatively connected to one another in the control arrangement of the continuously variable transmission. The two-way spool valve 42 has a supply port 43 and a load port 24. The linear solenoid valve has a fixed orifice $A_1$ and a variable orifice $A_2$ whose opening is controlled by the voltage applied to the solenoid. In operation, load flow $Q_L$ establishes a load pressure $P_L$ which is fed back to an opening at one end 27 of the two-way spool valve to a fixed orifice resulting in a feedback pressure $P_{LF}$ being exerted on the spool valve. A control pressure $P_C$ and a control flow $Q_C$ is exerted on the other end 29 of the spool valve. $P_C$ is controlled by diverting flow away from the opening 30 through the variable orifice $A_2$. The position of the valve spool 28 is determined by the difference of the forces applied to the two ends of the spool due to the pressure $P_C$ and $P_{LF}$. The load flow $Q_C$ is determined by the open area of the load port 24 which is dependent on the position of the valve spool 28 within the valve body.

In summary, the solenoid voltage controls the opening of variable orifice $A_2$, variable $A_2$ controls the control pressure $P_C$, control pressure $P_C$ in conjunction with the feedback pressure $P_{LF}$ control the spool valve position, and the spool valve position controls the opening area of the load port 24, which determines the load flow $Q_L$ and the resulting load flow pressure $P_L$. Load pressure $P_L$ is lowered by use of a load leakage flow path associated with the hydraulicload as shown schematically at 31 in FIG. 3.

Figure 3:
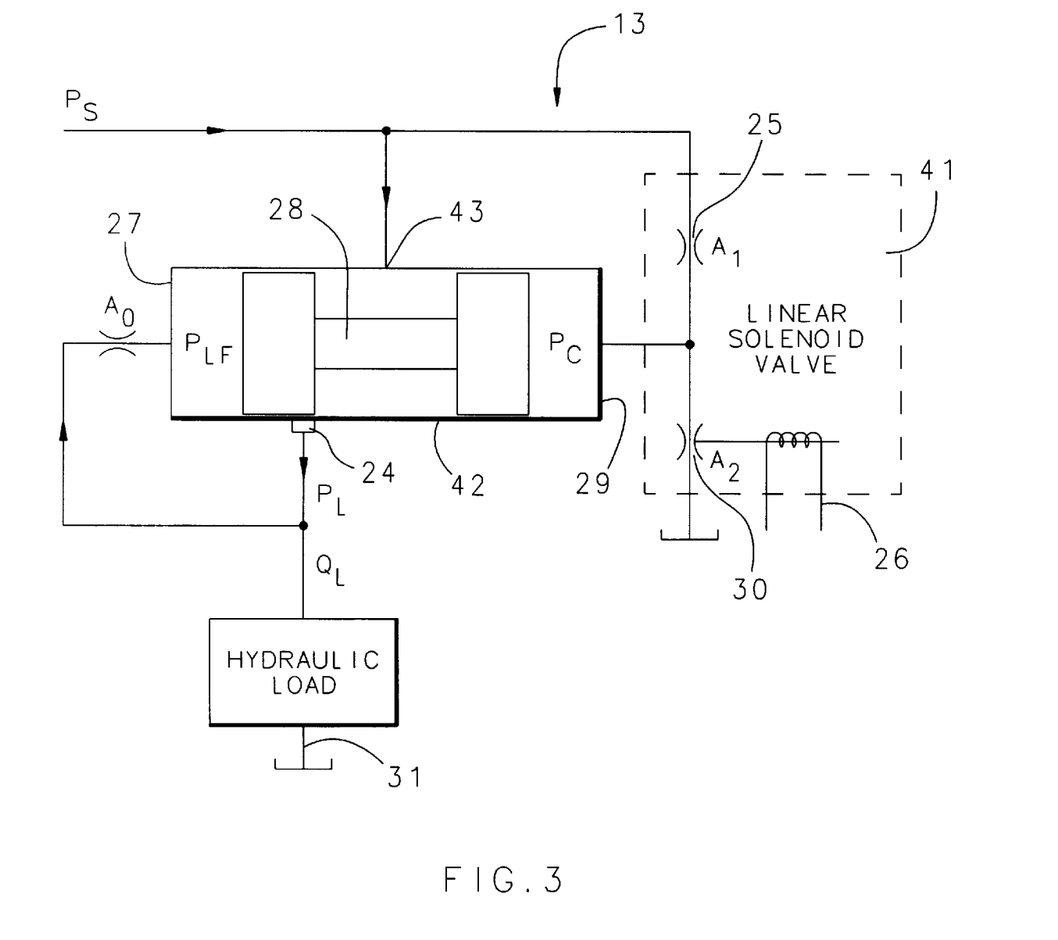
FIG. 3 is a schematic drawing of an electrohydraulic pressure reducing valve according to a first embodiment of the invention utilized in combination with a load having a load leakage flow.
Figure 4:
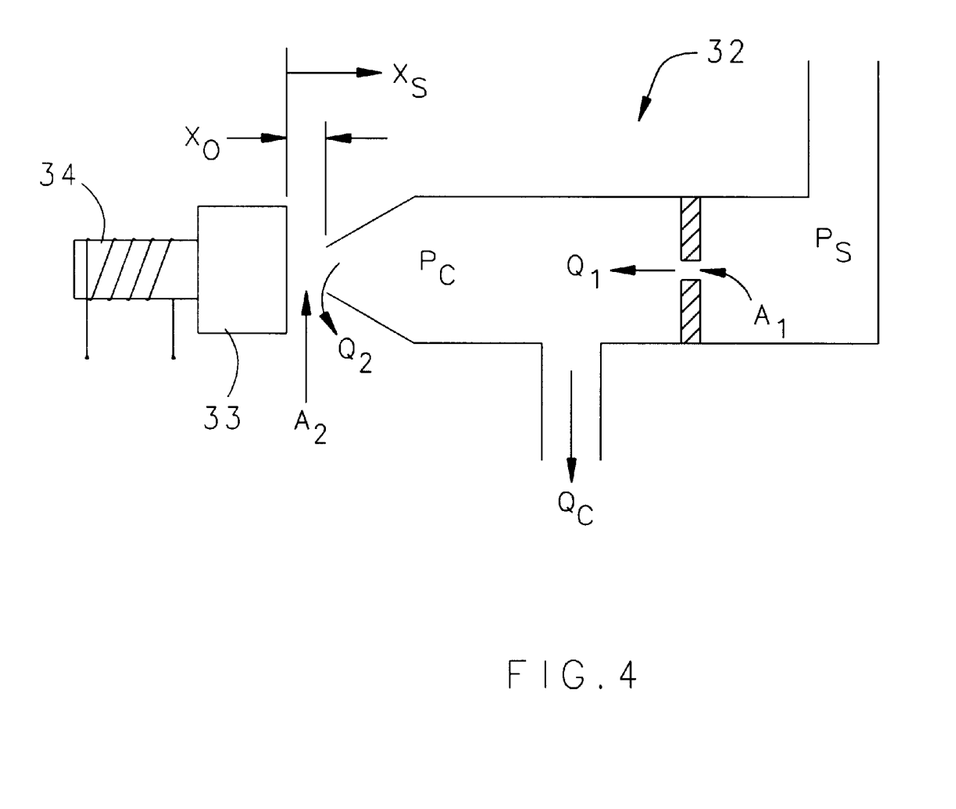
FIG. 4 is a schematic drawing of a torque motor controlled single-jet flapper valve which may be used as the pilot stage control valve in the pressure reducing valve of FIG. 3 in lieu of the linear solenoid control valve thereof.

According to another form of the invention, the linear solenoid valve 21 of the pressure control valve 13 in FIG. 3 can be replaced by torque motor controlled single-jet flapper valve 32 as shown in FIG. 4. The single-jet flapper valve has a fixed orifice $A_1$ and an opening $A_2$ in operation, control pressure Pc and flow Qc is controlled by diverting flow $Q_2$ through the opening $A_2$. The amount of flow diverted is determined by distance $X_o$–$X_s$ flapper valve 33 is away from the opening $A_2$. This distance is controlled by the voltage applied to the torque motor 34 of the valve. The remainder of the operation is the same as described in the aforementioned embodiment. Thus, the load pressure $P_L$ can be made proportional to the voltage applied to the torque motor 34 of the flapper valve.

Figure 5:
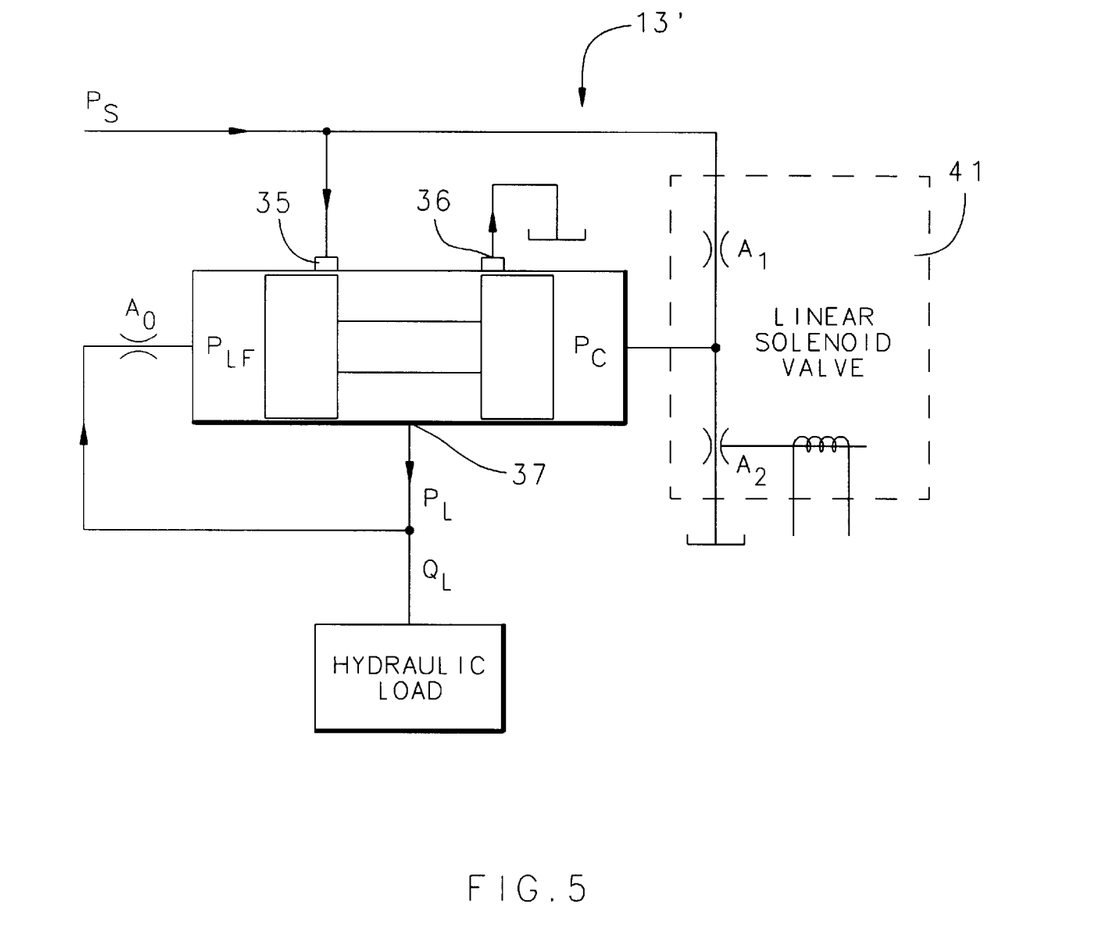
FIG. 5 is a schematic drawing of another embodiment of the electrohydraulic pressure reducing valve of the invention with drain port.

In the above-described embodiments of the pressure control valve, a load leakage flow path 31 is necessary to make it possible for lowering the load pressure. If large leakage flow is undesirable, the spool valve can be constructed according to another embodiment of the invention as shown in FIG. 5 wherein the main stage valve is a three-way valve with a supply port 55, a drain port 56, and a load port 37 provided in the valve body. Control flow $Q_C$ and control pressure $P_C$ and valve spool position are controlled in the same way as described with respect to pressure control valve 13 of FIGS. 3 and 4. However, the open area of supply port 35 and drain port 36 are controlled by the valve spool position and the load port 37 remains open. Load flow $Q_L$ and low pressure $P_L$ are controlled by varying the open area of supply port 35 by the position of the valve spool. Load pressure $P_L$ is lowered by moving the valve spool to a position to where drain port 36 is open. This allows operation without a load leakage path.

Figure 6:
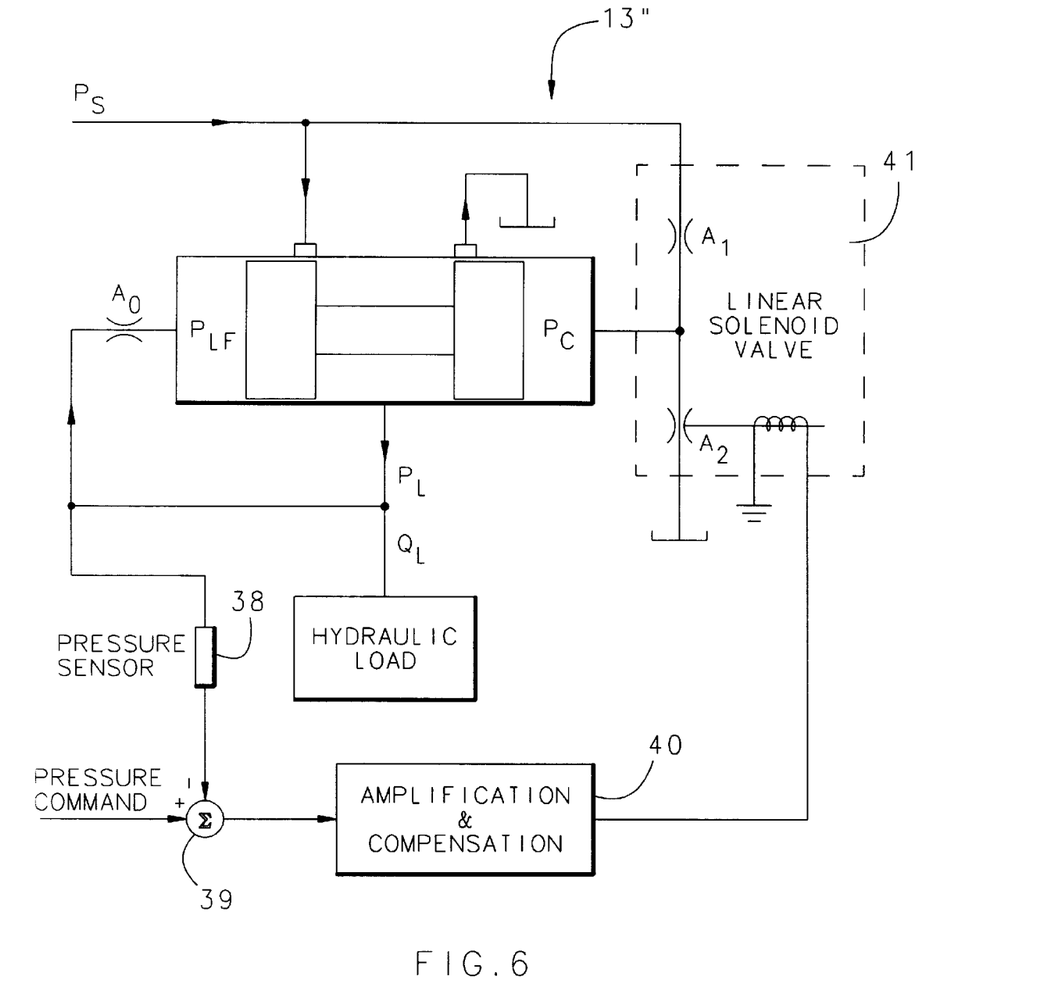
FIG. 6 is a schematic illustration of a closed-loop pressure control arrangement with the embodiment of the invention shown in FIG. 5.

A further embodiment of the pressure control valve 13" is illustrated in FIG. 6. A closed-loop pressure control is utilized in this embodiment to attain greater accuracy and control. As shown in FIG. 6, low pressure is sensed by pressure sensor 38 and compared to the load pressure command at comparator 39. The resulting error signal is then compensated and amplified at 40 to produce the voltage for pilot stage control, e.g. for either the linear solenoid valve or the torque motor controlled single-jet flapper valve used to control the control pressure $P_C$.

While only several embodiments of the invention have been disclosed herein, it is apparent that various modifications and alterations of the invention may be made. It is therefore the intention in the appended claims to cover all such modifications and alterations as may fall within the spirit and scope of the invention.

I claim:

1. A pressure reducing valve for use with a source of constant hydraulic pressure, comprising a pilot stage control valve providing an output control pressure and flow of a fluid from a source of constant hydraulic pressure passing through the pilot stage control valve in response to an input signal applied to the pilot stage control valve from an external source, said pilot stage control valve comprising a fixed orifice through which said flow of fluid from said source passes, a variable orifice downstream of said fixed orifice in a flow passage through said pilot stage control valve, the opening of said variable orifice being controlled by said signal applied to said pilot stage control valve from said external source for varying said output control pressure provided by said pilot stage control valve, and a main stage two-way spool valve having a valve body and a valve spool movable within the valve body in response to an imbalance of forces on said valve spool, said valve body having a supply port for receiving pressurized fluid from said source of said constant hydraulic pressure and a load port for communicating a load pressure and flow of pressurized fluid from the spool valve to a hydraulic load, an open area of said load port being dependent on the position of said valve spool within said valve body, said valve body having a first passage communicating said control pressure and flow from said pilot stage control valve to one end of said valve spool and a second passage communicating the feedback pressure and flow from said load pressure from said spool valve to the other end of said valve spool, and wherein the position of said valve spool within said valve body depends on the pressure difference applied on said two ends of said valve spool whereby the load pressure from said spool valve to said hydraulic load can be made proportional to said input signal applied to said pilot stage control valve.

2. The pressure reducing valve according to claim 1, wherein said input signal applied to said pilot stage control valve from an external source is an electrical signal applied to said pilot stage control valve for varying the opening of said variable orifice thereof to vary said output control pressure to said one end of said valve spool.

3. The pressure reducing valve according to claim 2, wherein said pilot stage control valve is a linear solenoid valve which is controlled by a voltage applied to a solenoid thereof as said input signal for varying said control pressure.

* * * * *